United States Patent Office 3,772,380
Patented Nov. 13, 1973

3,772,380
PRODUCTION OF CARBOXYLIC ACIDS
AND ESTERS
Frank E. Paulik, St. Louis, Arnold Hershman, Creve
Coeur, James F. Roth, Maryland Heights, and Walter
R. Knox, Town and Country, Mo., assignors to Monsanto Company, St. Louis, Mo.
Continuation-in-part of abandoned application Ser. No. 628,578, Apr. 5, 1967. This application Mar. 12, 1970, Ser. No. 2,376
Int. Cl. C07c 51/12, 67/00
U.S. Cl. 260—488 K                  20 Claims

ABSTRACT OF THE DISCLOSURE

The present invention relates to a process for the preparation of carboxylic acids and esters, specifically by the reaction of alcohols and their ester, ether and halide derivatives with carbon monoxide in the presence of catalyst systems containing as active constituents an iridium component and a halogen component. The process is also directed to the production of mixtures of organic acids and/or organic esters.

CROSS-REFERENCE TO RELATED APPLICATION

This application is a continuation-in-part of application Ser. No. 628,578, filed Apr. 5, 1967, now abandoned.

BACKGROUND OF THE INVENTION

This invention relates to a process for the preparation of carboxylic acids and esters. More particularly, it relates to a process for the reaction of alcohols and the ester, ether and halide derivatives thereof with carbon monoxide in the presence of catalyst systems containing as active constituents an iridium component and a halogen component to yield carboxylic acids and/or esters selectively and efficiently.

Carbonylation processes for the preparation of carboxylic acids from alcohols are well known in the art and have been directed especially to the production of acetic acid by the carbonylation of methanol. The prior art teaches the use of a number of catalysts for the synthesis of carboxylic acids by reaction of alcohols with carbon monoxide at elevated temperatures and pressures in both gas phase fixed bed reactions and liquid phase reactions. Catalysts such as phosphoric acid, phosphates, activated carbon, heavy metal salts such as zinc and cuprous chlorides, silicates of various metals, and boron trifluoride in various hydration states have been reported to function for the production of acetic acid by reaction of methanol and carbon monoxide at elevated temperatures and pressures of the order of 400° C. and 10,000 p.s.i.g., respectively. However, even under such severe conditions, the yields of acid were poor and uneconomical. Somewhat less severe reaction conditions of temperature and/or pressure have been reported with respect to specific catalysts compositions, e.g., 330° C.–340° C. and 2250 p.s.i.g. using liquid phosphoric acid containing copper phosphate; 300° C.–500° C. and 2000 p.s.i.g.–4000 p.s.i.g. using active charcoal impregnated with phosphoric acid; and 260° C.–360° C. and 2800 p.s.i.g.–15,000 p.s.i.g. using metal carbonyls, such as iron, cobalt and nickel, in conjunction with their halides or free halogens in the liquid phase. Even using these specific catalyst compositions at the less severe reaction conditions, substantially poorer yields of the desired carboxylic acid product and substantially slower reaction rates are obtained than those achieved in the process of this invention.

Certain disadvantages present in the carbonylation processes described in the prior art are catalyst instability, lack of product selectivity, and low levels of catalyst reactivity. One particular disadvantage of carbonylation processes of the prior art is their dependence upon the use of catalysts comprised of such metal carbonyls or modified metal carbonyl as dicobalt octacarbonyl, iron carbonyl and nickel carbonyl, all of which require the use of high partial pressures of carbon monoxide to remain stable under the necessarily high reaction temperatures employed. For example, dicobalt octacarbonyl requires partial pressures of carbon monoxide as high as 3000 p.s.i.g. to 10,000 p.s.i.g. under normal carbonylation conditions of 175° C. to 300° C.

Still another disadvantage of carbonylation processes disclosed in the prior art is their relatively low level of activity. This low level of activity requires higher catalyst concentrations, longer reaction times, and higher temperatures to obtain substantial reaction rates and conversions. Consequently, larger and costlier processing equipment is required.

Another disadvantage of carbonylation processes disclosed heretofore is their inability to maintain high selectivity to the desired carboxylic acid at temperatures required for high conversion levels and high reaction rates. At these higher temperatures undesirable by-products comprising substantial amounts of ethers, aldehydes, higher carboxylic acids, carbon dioxide, methane and water are formed, thereby resulting in substantial yield losses and necessitating additional product purification and recycle steps in the processing.

Another disadvantage of carbonylation processes described in the prior art is their dependence on catalyst systems which require the use of substantially chemically pure carbon monoxide feedstocks to maintain high selectivity and high yield to the desired carboxylic acid product. For example, certain cobalt containing catalyst systems described heretofore when employed with carbon monoxide feed streams containing impurities such as hydrogen, result in the production of a number of undesirable by-products including methane, carbon dioxide, aldehydes, alcohols of the same carbon number as the desired carboxylic acid, and carboxylic acids of higher carbon number than desired. Consequently, substantial loss in selectivity and yield to the desired carboxylic acid occurs. Catalysts of the prior art cause the formation of troublesome gaseous by-products such as carbon dioxide and methane as well as dimethyl ether in the reactor system, thereby suppressing the carbon monoxide partial pressure and ultimately causing a decrease in the desired carbonylation reaction rate. Often additional processing steps are required to remove these undesirable by-products, necessitating the use of larger and costlier processing equipment.

It is, therefore, an object of the present invention to overcome the above disadvantages and thus provide an improved and more economically and commercially feasible carbonylation process for the production of organic acids and their esters.

Another object of this invention is to provide a more reactive and more stable carbonylation catalyst system than has been heretofore described in the prior art.

Still another object of the present invention is to provide a more selective and more reactive carbonylation catalyst system for the production of carboxylic acids.

Another object of the present invention is to provide a carbonylation catalyst system which results in the production of a higher yield of the desired carboxylic acid with no substantial formation of ethers, aldehydes, higher carboxylic acids, carbon dioxide, methane, water and other undesirable by-products.

Still another object of the present invention is the provision of an improved carbonylation process enabling the efficient and selective production of carboxylic acids or their esters by reaction of alcohols and alcohol derivatives with carbon monoxide in the presence of an improved and more stable catalyst system, thus enabling the use of lower catalyst concentration, lower temperature, lower pressure, and shorter contact time than has been generally possible heretofore, and facilitating product isolation, catalyst recovery and recycle without substantial catalyst decomposition and loss.

These and other objects of the present invention will become apparent to those skilled in the art from the accompanying description and disclosure.

SUMMARY OF THE INVENTION

In accordance with the present invention, a feed component comprising a saturated hydrocarbonyl alcohol or the ester, ether or halide derivative thereof or mixtures of these are converted selectively to a carboxylic acid or an ester of such feed component or a mixture of such acid and ester, by reacting the feed component in the liquid phase with carbon monoxide at temperatures from about 50° C. to 300° C. and at partial pressures of carbon monoxide from 1 p.s.i.g. to 15,000 p.s.i.g. preferably 5 p.s.i.g. to 3,000 p.s.i.g. and more preferably 10 p.s.i.g. to 1,000 p.s.i.g., although higher pressures may be employed, in the presence of a catalyst system containing as active constituents an iridium component, and a halogen component in which the halogen is selected from the group consisting of bromine and iodine, preferably iodine. The present process is particularly advantageous at lower pressures, although higher pressures may also be used.

DESCRIPTION OF THE PREFERRED EMBODIMENTS

As referred to above, for purposes of the present invention, the catalyst system essentially includes an iridium component and a halogen component in which the halogen is either bromine or iodine. Generally, the iridium component of the catalyst system of the present invention is believed to be present in the form of a coordination compound of iridium with a halogen component providing at least one of the ligands of such coordination compound. In addition to the iridium and halogen in the process of the present invention, these coordination compounds also generally include carbon monoxide ligands thereby forming such compounds or complexes of iridium as $Ir(CO)_3Br$, $Ir(CO)_2I_2$, $Ir(CO)_2Br_2$ and the like. Other moieties may be present if desired. Generally, it is preferred that the catalyst system contain as a promoting component, an excess of halogen over that present as ligands in the iridium coordination compound. The terms "coordination compound" and "coordination complex" used throughout this specification mean a compound or complex formed by combination of one or more electronically rich molecules or atoms capable of independent existence with one or more electronically poor molecules or atoms, each of which may also be capable of independent existence.

The essential iridium and halogen component of the catalyst system of the present invention may be provided by introducing into the reaction zone a coordination compound of iridium containing halogen ligands or may be provided by introducing into the reaction zone separately an iridium compound and a halogen compound. Among the materials which may be charged to the reaction zone to provide the iridium component of the catalyst system of the present invention are iridium metal, iridium salts and oxides, organo iridium compounds, coordination compounds of iridium and the like. Specific examples of materials capable of providing the iridium constituent of the catalyst system of the present invention may be taken from the following non-limiting partial list of suitable materials.

$IrCl_3$
$IrBr_3$
$IrI_3$
$IrCl_3 \cdot 4H_2O$
$IrBr_3 \cdot 4H_2O$
$Ir(CO)_2Cl_2$
$Ir(CO)_2Br_2$
$Ir(CO)_2I_2$
$[(n-C_4H_9)_4N][Ir(CO)_2X_2]$ where $X=Br^-, I^-$
$[(n-C_4H_9)_4As]_2[Ir_2(CO)_4Y_4]$ where $Y=Br^-$
$[(n-C_4H_9)_4P][Ir(CO)I_4]$
$Ir[(C_6H_5)_3P]_2(CO)Br$
$Ir[n-C_4H_9)_3P]_2(CO)Br$
$Ir[(n-C_4H_9)_3P]_2(CO)I$
$IrBr[(C_6H_5)_3P]_3$
$Ir[(C_6H_5)_3P]_3$
$Ir_2(CO)_8$
$Ir[(C_6H_5)_3P]_2(CO)I$
$Ir[(C_6H_5)_3P]_2(CO)Cl$
$IrCl[(C_6H_5)_3P]_2(CH_3I)_2$
$Ir(SnCl_3)[(C_6H_5)_3P]_3$
Ir metal
$Ir(NO_3)_3$
$IrCl(CO)[(C_6H_5)_3As]_2$
$IrI(CO)[(C_6H_5)_3Sb]_2$
$IrCl[(C_6H_5)_3P]_3$
$IrCl[(C_6H_5)_3P]_3H_2$
$[(C_6H_5)P]Ir(CO)H$
$[Ir(C_2H_4)_2Cl]_2$
$K_4Ir_2Cl_2(SnCl_3)_4$
$Ir_2O_3$
$K_4Ir_2Br_2(SnBr_3)_4$
$K_4Ir_2I_2(SnI_3)_4$
$IrO_2$ With the above materials capable of providing the iridium component but not containing a halogen component from the group consisting of bromine and iodine, it will be necessary to introduce into the reaction zone such a halogen component. For example, if the iridium component introduced is iridium metal or $IrO_2$, it will be necessary to introduce a halide component such as methyl iodide, hydrogen iodide, iodine or the like.

As noted above, while the halogen component of the catalyst system may be in combined form with the iridium as, for instance, one or more ligands in a coordination compound of iridium, it generally is preferred to have an excess of halogen present in the catalyst system as a promoting component. By excess is meant an amount of halogen greater than two atoms of halogen per atom of iridium in the catalyst system. This promoting component of the catalyst system consists of a halogen and/or halogen compound such as hydrogen halide, alkyl- or aryl halide, metal halide, ammonium halide, phosphonium halides, arsonium halide, stibonium halide and the like. The halogen of the promoting component may be the same or different from that already present as ligands in the coordination compound of iridium. Generally, the halogen in the promoting component is iodine or bromine with iodine being preferred. Accordingly suitable halogen-containing or promoting components may be selected from the following list of halogen and/or halogen-containing compounds.

| | | | |
|---|---|---|---|
| RX | where and | R=any alkyl- or aryl- group X=Br or I | e.g., $CH_3I$, $C_2H_5Br$, $CH_3CH_2I$, etc. |
| $X_2$ or $X_3$ | where | X=Br or I, | e.g., $Br_2$, $I_2$, $I_3$, etc. |
| HX | where | X=Br or I, | e.g., HBr, HI |
| RCX ‖ O | where | R=any alkyl- or aryl- group | e.g., $CH_3\overset{\text{O}}{\underset{\text{‖}}{C}}I$, etc. |
| | and | X=Br or I | |
| $R_4MX$, $R_4MX_3$ or $R_3MX_2$ | where | R=hydrogen or any alykl- or aryl- group M=N, P, As or Sb X=Br or I | e.g., $HN_4I$, $PH_4I_3$, $PH_3I$, $PH_3Br_2$, $(C_6H_5)_3PI_2$ and/or combinations of R, M, and X. |

Although any amount of the promoting component of the catalyst system of the present invention may be employed, the amount employed is such as to produce a ratio of atoms of halogen to atoms of iridium in the catalyst system of from above 2:1 to 50,000:1 and higher. However, the preferred ratio is from above 2:1 to 5,000:1 halogen atoms per iridium atom. A more preferred ratio of halogen atoms to iridium atoms is 3:1 to 1000:1.

Preferably, the process of the present invention is carried out in an acidic reaction medium. For purposes of the present invention, an acidic reaction medium is defined as one in which an alkyl halide is present or will be formed. The alkyl halide usually is one in which the alkyl radical corresponds to an alkyl radical of the feed alcohol, ester, ether or halide.

Such alkyl halide may be added to the reaction medium as such or may be formed in situ within the reaction medium from the feed alcohol, ester, ether or halide and the halide present in the catalyst system. The reaction medium is considered acidic when under reaction conditions as herein set forth, at least 0.1% of the total halogen atoms in the system is present as the alkyl halide. Preferably, however, at least 1.0% of the total halogen atoms in the system is present as the alkyl halide.

The liquid reaction medium employed may include any solvent compatible with the catalyst system such as pure alcohols, mixtures of the alcohol feedstock and/or the desired carboxylic acid and/or esters of these compounds. However, the preferred solvent and liquid reaction medium for the present invention is the desired carboxylic acid itself. Water may also be added to the reaction mixture if desired.

Suitable feedstocks are saturated hydrocarbyl alcohols although these alcohols may be charged together with an acid or ester as discussed below. The term "saturated hydrocarbyl," as used herein, is meant to include not only the saturated acyclics, i.e., alkyls, but also the saturated alicyclics, i.e., cycloalkyls, and the alicyclicacyclics. These feedstocks also include the alkyl saturated hydrocarbyl halides, esters and ether derivatives of the desired alcohol feedstock.

Examples of useful feedstocks employed for the carbonylation reaction of the present invention include the following compounds:

ROH wherein R is a saturated hydrocarbyl radical of 1 to 20 carbon atoms,

R'—O—R' wherein R' is a saturated hydrocarbyl radical of 1 to 19 carbon atoms and wherein the total number of carbon atoms in the compound does not exceed 20, wherein R' is a saturated hydrocarbyl radical of 1 to 19 carbon atoms and wherein the total number of carbon atoms in the compound does not exceed 20,

R—X wherein R is a saturated hydrocarbyl radical of 1 to 20 carbon atoms and X is a halogen which is chlorine, bromine or iodine.

The saturated hydrocarbyl radicals in the above compounds include straight-chain, branched-chain and cyclic saturated radicals and generally contain one carbon atom less than that of the desired acid. Included within these feed materials are such specific compounds as methanol, ethanol, propanol and isopropanol, the butanols, pentanols, hexanols, cyclohexanols, cyclopentanols and also the higher alcohols such as the decanols, dodecanols, hexadecanols, nonadecanols and including isomeric forms, methyl ether, ethyl ether, n-propyl ether, isopropyl ether, n-butyl ether, methyl acetate, ethyl acetate, pentyl acetate, methyl chloride, propyl bromide, heptyl iodide, and the like.

Polyhydric saturated hydrocarbyl alcohols may also be employed as starting materials for the production of polybasic acids, for example, 1,4-butanediol, which when subjected to reaction with carbon monoxide under the conditions described herein with the catalyst of the invention, yields adipic acid.

The most useful feedstocks are the alkanols of 1 to 20 carbon atoms and the ester, ether and halide derivatives thereof. Particularly useful as feedstocks are the alkanols of 1 to 10 carbon atoms and the ester, ether and halide derivatives thereof with alkanols of 1 to 5 carbon atoms and the ester, ether and halide derivatives thereof being preferred feeds. Methanol is the particularly prefered feed. It is to be understood that the feed may include a mixture of the above defined alcohols, esters, ethers or halides.

In accordance with the present invention the carbonylation reaction may be carried out by intimately contacting the above defined feed component, preferably an alcohol, which depending on the carbon number and operating conditions may either be in the vapor or liquid phase, with gaseous carbon monoxide in a liquid phase containing a catalyst system such as iridium dicarbonyl diiodide and a halogen-containing promoting component, such as methyl iodide, under conditions of temperature and pressure suitable as described herein to form the carbonylation product. The particular conditions selected are the same whether the feed component is charged as a vapor or liquid. The temperature accordingly will be in the range of 50° C. to 300° C. with the preferred range being 100° C. to 240° C. Partial pressures of carbon monoxide of the order of 1 p.s.i.g. to 15,000 p.s.i.g. may be employed, however, 5 p.s.i.g. to 3000 p.s.i.g. carbon monoxide partial pressure is generally preferred and a more preferred range is from 10 p.s.i.g. to 1000 p.s.i.g. Higher pressures may be used if desired under appropriate conditions.

Alternatively, carboxylic acids may be produced if desired via reaction of the feed components and carbon monoxide in the vapor phase over the iridium containing catalyst systems described above, dispersed upon inert supports. Such a catalyst system may be operated as a conventional fixed bed catalytic reactor. For example, methanol, methyl iodide and carbon monoxide may be passed over a catalyst system such as $Ir(CO)_3I_3$, dispersed on an inert support material such as Alundum, activated carbon, clays, alumina, silica-alumina, ceramics, etc., in a fixed bed reactor maintained at elevated temperatures and pressures to produce acetic acid in high yields. However, the use of a liquid reaction medium, as above described, is preferred in the process of this invention.

While any amount of carbon monoxide may be employed, a typical carbonylation reaction selective to carboxylic acid requires at least one mole of carbon monoxide per hydrocarbyl radical (molar basis). Excess of carbon monoxide over the aforesaid stoichiometric amount, however, may be present. Carbon monoxide streams containing inert impurities such as hydrogen, carbon dioxide, methane, nitrogen, noble gases, water and paraffinic hydrocarbons having from 1 to 4 carbon atoms, may be employed, if desired, for example, from an available plant gas stream, with no adverse effect; however, in such cases total reactor pressure will have to be increased to maintain a desired carbon monoxide partial pressure. The concentration of carbon monoxide in the feed gas mixture is from 1 vol. percent to 100 vol. percent, a preferred range being from 10 vol. percent to 99.9 vol. percent.

The reaction rate is dependent upon catalyst concentration and temperature. Concentrations of the iridium containing component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. However, higher concentration even to the extent of 1 mole/liter may be used if desired. Higher temperatures also favor higher reaction rates.

The active iridium containing catalyst system is preferably supplied as a catalyst solution. The solution can also include liquid reactants, products and mixtures thereof which function as solvents or reaction media. It has been found that the nature of the products obtained in the present carbonylation process can be controlled by the use of various proportions of alcohol, ester and acid as the solvent for such a catalyst solution. A preferred group of solvents is discussed below for use when reacting the aforementioned preferred saturated hydrocarbyl alcohols having from 1 to 20 carbon atoms. This preferred group of solvents is comprised of the alcohol in the feed, an acid having 1 carbon atom more than such alcohol, the ester of the said acid and the said alcohol, the diether of the said alcohol, a halide of the said alcohol and mixtures thereof. A still more preferred group of solvents is comprised of the aforesaid alcohol, the acid, and the ester of the said acid and said alcohol.

It has been found that a preferred range of molar ratios of the said alcohol to the said ester when employing these two components in the liquid reaction medium is from 0.001:1 to 10,000:1. However, within this range, there are subranges of ratios of alcohol to ester which are conductive to the formation of particular product distributions.

The use of an alcohol-ester containing liquid reaction medium in which the alcohol to ester molar ratio is less than 2:1, preferably 0.001:1 to 2:1 (and including pure ester as the feed to the reaction) yields a product with a high proportion of acid, e.g., reaching substantially 100% organic acid. Alternatively, the use of such a ratio of alcohol to ester in which the ratio is greater than 10:1, preferably 10:1 to 10,000:1, (including a pure alcohol as the feed) may yield a product with a very high proportion of the ester, e.g., reaching substantially 100% ester.

Within this latter alcohol/ester ratio range of 10:1 to 10,000:1 there exist two alternative embodiments of the invention. In the first such embodiment the product consists essentially of 100% ester at alcohol conversion levels up to about 90 mole percent. The second such embodiment exists when the alcohol conversion level exceeds about 90 mole percent in which instance the product is substantially completely the acid. Within the alcohol to ester ratio range of 2:1 to 10:1 within the reaction medium, the relative proportions of acid and ester in the product may be controlled in the same manner. As the ester concentration goes down, the ester production goes up subject to the conversion level as above indicated.

The above cases are summarized below:

| Alcohol/ester ratio in reaction medium: | Major product |
|---|---|
| 0.001:1 to 2:1 | Acid. |
| 2:1 to 10:1 | Mixed acid and ester. |
| 10:1 to 10,000:1 | |
| (a) to about 90% alcohol conv. | Esters. |
| (b) above about 90% alcohol conv. | Acid. |

The desired acid of one carbon atom more than that of the hydrocarbyl radical of the feed component may be present in the reaction mixture, e.g., as solvent. This acid will readily esterify, and the control of the product distribution taught above is applicable, with the ratio of alcohol to ester being the controlling factor.

The preferred ratio range for high ester production is an alcohol/ester ratio in the reaction medium of 10:1 to 10,000:1. The preferred ratio range for high acid production is an alcohol/ester ratio of 0.001:1 to 2:1.

In carrying out of the above described embodiment for the production of high proportion of acid, e.g., acetic acid, as the desired product, the charge to the reactor includes a relatively low proportion of the alcohol. Thus, in the production of acetic acid as the major product, the ratio generally is no more than 2 moles of methanol per mole of methyl acetate. Consequently the purification system employs a distillation train to recover the acetic acid product by distillation, while the remaining lower boiling components consisting principally of methyl iodide, unreacted methanol, and methyl acetate are recycled.

In the absence of other compounds as solvents having a higher boiling point than acetic acid discussed below), a portion of the acetic acid product containing the iridium and halogen catalyst system is recycled to the reactor to return the said catalyst system to the reaction zone.

In carrying out a second embodiment, described above, for the production of high proportion of ester, e.g., methyl acetate, as the desired product, the charge to the reactor includes a relatively high proportion of alcohol, e.g., greater than 10 moles of methanol per mole of methyl acetate. Consequently the purification system employs a distillation train to recover the methyl acetate by distillation, while the remaining components consisting principally of the iridium containing component, methyl iodide (or other halide containing promoting components) methanol and acetic acid are recycled. The methyl acetate is hydrolyzed for example by contacting with steam, as described herein, thus isolating the acetic acid with the recovery of methanol, which may be recycled. However, the ester product is often used, per se, for example, as a solvent in chemical processing or for the formulation of coating compositions. In this embodiment, the process is operated under conditions such as to maintain alcohol conversion below 90%.

When an ester, ether or halide is present in the feedstock or reaction medium, it is normally present with equimolar amounts of water, although more or less water may be used. The reference to the ester in the above ratios, is on the basis that a molar quantity of water is present equivalent to the number of moles of ester present.

It has been found that water may exert an effect on the distribution of products. For example, an amount in excess of the equimolar quantity of water to ester, e.g., an excess equal to 50% to 300% of such equimolar quantity, already present with such ester, as discussed above, promotes the production of the carboxylic acid. On the other hand, smaller quantities of water, e.g., 50% to 100% of the equimolar proportions discussed above, favor the production of ester.

The above catalyst solutions essentially comprised of: (1) the reactant feed component-product acid medium, (2) an iridium component, and (3) a halogen component, generally in excess of the iridium as hereinabove set forth, may be further modified by the addition of a high boiling, inert solvent as a further component. Such an inert solvent must have a boiling point at least 25° C. higher (S.T.P.) than the product acid and/or ester. Inert solvents withint he present category include paraffin hydrocarbons of from 10 to 30 carbon atoms, aromatic hydrocarbons of from 12 to 40 carbon atoms, organic acids of from 3 to 20 carbon atoms, and esters composed of the aforesaid acids in combination with the feedstocks undergoing carbonylation, and also orthophosphorus and orthosilicon alkoxy esters in which the alkoxy group has the same number of carbon atoms as the feedstock undergoing carbonylation, as well as the chlorine, bromine and iodine containing derivatives of all of the above said solvents. The following list exemplifies such solvents: dodecane, hexadecane, naphthalene, biphenyl, propionic acid, octanoic acid, phthalic acid, benzoic acid, dioctyl phthalate, dimethyl phthalate, ethyl benzoate, didecyl phthalate, dimethyl adipate, triphenyl phosphate, tricresyl phosphate, dibutylphenyl phosphate, tetramethyl orthosilicate, tetrabutyl orthosilicate, chloronaphthalene, chlorinated biphenyls, etc.

The inert solvents, as described, refer to the actual molecular species which are present in the carbonylation reaction mixture. Consequently, modified derivatives may be charged initially, for example, an ester having a number of carbon atoms which is greater or less than the aforesaid ranges by one, two or more carbon atoms. Under reaction conditions in the presence of an alcohol feedstock, such esters undergo ester interchange to equilibrium species which are within the above ranges.

Another embodiment of the process utilizes a high-boiling, inert solvent such as dimethyl phthalate as described above, with the relatively high proportion of an alcohol to ester, as above described, together with an active iridium component, i.e., a coordination compound of iridium having halogen ligands, and a halogen containing promoter. In this embodiment, particularly suitable for use with a gas-sparged reactor system, the feed is a liquid such as methanol with the carbon monoxide introduced in gaseous form. The product stream is then removed as a vapor containing methyl acetate as the principal component. In this embodiment of the invention, no liquid is withdrawn, so that a distinct advantage exists because of the elimination of catalyst handling; and, consequently a minimization of catalyst losses. The vapor stream leaving the reactor is then condensed; it contains the methyl acetate which is recovered from the liquid condensate by distillation, and a small proportion of acetic acid which is recycled. The methyl acetate is hydrolyzed with water or steam to yield acetic acid as the major product while the methanol resulting from the hydrolysis of the ester is recycled.

Another embodiment of the invention is based upon the use of the carbonylation reaction as described herein for the purification of hydrogen streams containing small percentages, e.g., 0.1 to 10 percent carbon monoxide by volume. Such a gas stream when available in an industrial plant is often desirable as a source of pure hydrogen, but is very difficult to free from carbon monoxide. The present process based upon the use of iridium-halogen catalyst systems is readily adaptable to this purification since the carbon monoxide in such a gas mixture readily undergoes reaction with an alcohol, for example, butyl alcohol to yield pentanoic acid. Because of the completeness of reaction, the carbon monoxide is completely removed from the gas mixture while the hydrogen is unreacted, and is easily separated as a pure stream of hydrogen gas. This embodiment of the invention using iridium and halogen containing catalyst systems, represents a major improvement over earlier carbonylation catalysts such as cobalt compounds. The cobalt compounds cannot tolerate the presence of hydrogen since the hydrogen also reacts with the acid and ester products, being catalyzed by the cobalt compounds. Consequently, a major redistribution of products with the production of different, higher acids, alcohols and aldehydes occurs when using cobalt catalysts.

The iridium and halogen containing catalyst systems of the present invention are characterized by an unusually high degree of specificity for the carbonylation reaction, e.g., the reaction of alcohols with carbon monoxide to obtain a carboxylic acid. Such control over the various competing reactions to obtain the carbxylic acid in high yield is surprising since other metal catalysts do not show such specificity for this reaction. The iron group metals such as iron, cobalt and nickel differ from the present catalyst systems in that the iron group metals simultaneously catalyze the hydrogenation reactions to a very high degree. Consequenly, the products obtained include the next higher alcohols as well as aldehydes and carboxylic acids having 2 more carbon atoms than the starting alcohols. Furthermore, the iron group catalysts, particularly cobalt, require a far higher carbon monoxide partial pressure to remain stable. When moderate pressures, e.g., less than about 2000 p.s.i.g. carbon monoxide partial pressure are employed, at a temperature of 175° C., the cobalt catalyst is found to plate out or decompose to the free metal which plates on the walls of the reactor and is thus lost as a catalyst.

Another distinction of the present iridium containing catalyst systems over the cobalt catalysts is the elimination of undesirable gaseous byproducts, including carbon dioxide and methane which are obtained as a result of the water-gas shift reaction catalyzed by cobalt. Furthermore, significant quantities of the undesirable byproduct, dimethyl ether, are also formed in the presence of the cobalt catalyst system, as shown in Examples 6 and 7 presented below. This particular ether compound attains a very high partial pressure at the reaction conditions employed, and thus, necessitates the use of a high total pressure in the reaction system in order to maintain the necessary partial pressure of carbon monoxide for the reaction which forms carboxylic acids, e.g., 2000 p.s.i.g. total pressure for 750 p.s.i.g. carbon monoxide partial pressure, at a reaction temperature of 175° C.

In order to provide for a better understanding of the process of the present invention as disclosed and claimed herein, a number of specific embodiments of the process are presented below. The examples and illustrations presented below are not to be construed as in any manner limiting to the scope of the invention.

Figure 1:
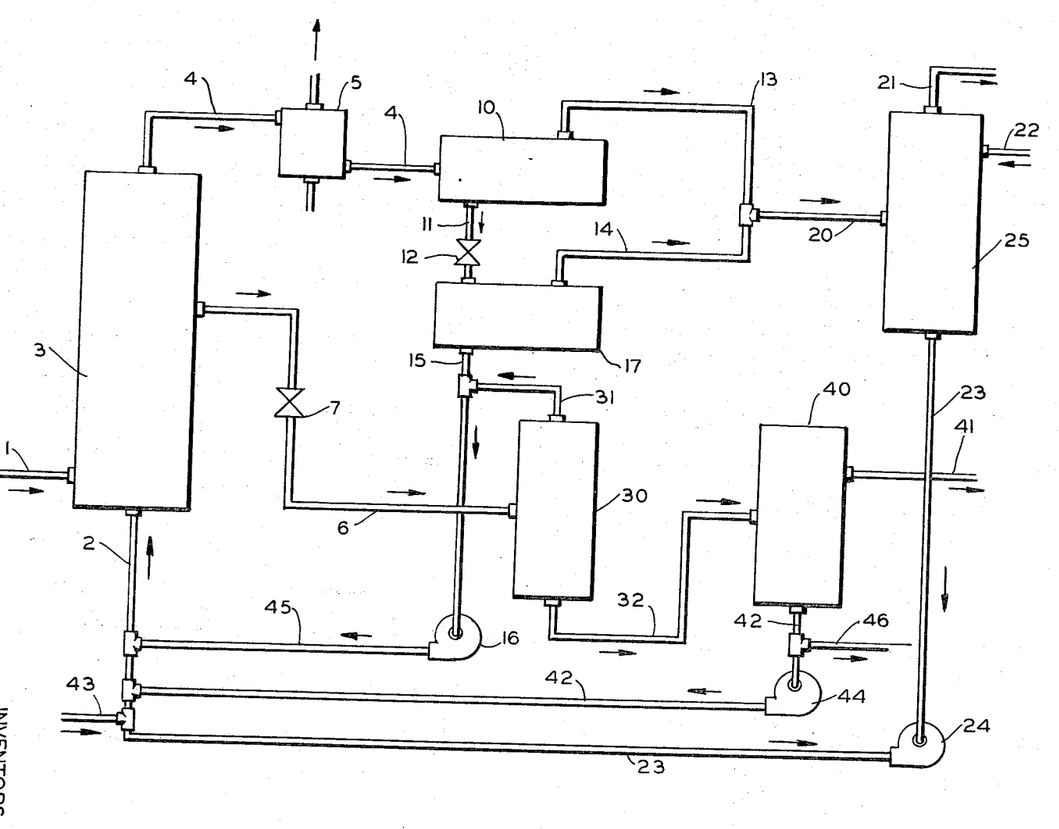
The accompanying drawing is a flow scheme illustrating an embodiment of the present invention.

The accompanying drawing, forming a part of the present specification also illustrates certain embodiments of the invention. Specifically, the drawing illustrates the manufacture of acetic acid using methanol as a feedstock. Referring to the drawing, a carbon monoxide stream is introduced into reactor 3 through line 1 and sparged into a liquid reaction medium within reactor 3. The carbon monoxide stream may contain components which are inert to the reaction such as hydrogen, nitrogen, methane, etc., in addition to the carbon monoxide. The reactor 3 contains 2,000 gallons of a liquid reaction medium which also contains $5 \times 10^{-3}$ moles (calculated as atomic iridium)/liter of iridium which was initially introduced into the reaction medium as $IrCl_3 \cdot 4H_2O$, and 0.2 mole/liter iodide, e.g., as methyl iodide. Through the liquid reaction medium, carbon monoxide is passed at a gas rate of 85 lb./min. The reaction is operated at 200° C. and 500 p.s.i.g. pressure. The liquid feed to the reactor is introduced through line 2. The feed to the reactors introduced through line 2 consists of a mixture of a methanol stream used to scrub the effluent gas (line 23), a catalyst recycle stream (line 42), a recycle stream containing principally methyl acetate, unreacted methanol, and methyl iodide (line 45), and a make-up stream to maintain the iridium and iodide concentration in the reactor (line 43). The make-up stream introduced through line 43 may contain a mixture of iridium and iodide components or only one or the other of such components depending upon need within the reactor 3.

The gaseous reactor effluent exits through line 4, is cooled to about 10° C. in exchanger 5, and goes to high pressure separator 10. The condensed liquid from separator 10 is removed through line 11; the pressure is let down through valve 12, and the liquid then goes to low pressure separator 17. The gas leaving the low pressure separator 17, through line 14, consisting principally of carbon monoxide, methyl iodide, methanol and methyl acetate, mixes with the gas effluent from the high pressure separator (line 13) which is principally carbon monoxide and enters the methanol scrubber 25 through line 20. In the scrubber 25, feed methanol introduced through line 22 at a rate of about 80 lb./min. is used to remove the small amount of methyl iodide, methyl acetate, and acetic acid from the gas before it leaves the system. The effluent gas containing carbon monoxide exiting through line 21 may either be recycled or if the inert gas content is high, it may be vented or burned. The methanol containing methyl iodide, methyl acetate and acetic acid is removed from scrubber 25 through line 23 and introduced to the reactor as line 23 after being pressured through pump 24.

The liquid effluent from reactor 3 is removed from the reactor 3 through line 6. After pressure let down valve 7, the liquid effluent is introduced into distillation or flash column 30 where the lower boiling compounds are separated from acetic acid and the other less volatile components such as the catalyst system. The lower boiling components consisting principally of methyl acetate, methyl iodide, and unreacted methanol exit through line 31 and mix with the condensed phase from the low pressure separator in line 15 which also contains these low boiling compounds. This mixed stream of lines 15 and 31 is compressed by pump 16 and recycled to the reactor as line 45.

The acetic acid, other higher boiling compounds and the iridium component are removed by line 32 from column 30 and enter distillation or flash column 40. In this column acetic acid, which may contain water, is separated from the other high boiling components including principally the iridium catalyst components. The acetic acid product is withdrawn as line 41 and may be further purified to remove water. The high boiling components including the iridium components exit through line 42 and are brought up to reactor pressure by pump 44. If no non-catalytic component higher boiling than acetic acid, such as a high boiling solvent, is present, then some acetic acid may be recycled through line 42 to return the catalyst components to the reactor. A small liquid purge stream may be withdrawn as line 46 to prevent build-up of non-catalytic high boiling compounds. After removal of impurities from line 46, the catalyst components remaining may be added to the make-up stream (line 43).

The process of the present invention may be operated either as a batch or as a continuous process. In batch operation the reactants are charged into the liquid catalyst solution which is then subjected to the desired temperature and pressure conditions, after which the products are separated from the reaction mixture. In a continuous process which is described above, the catalyst system is maintained in liquid state, with the reactants being continuously supplied to the reaction zone containing the catalyst system at the desired temperature and pressure. The products are continuously withdrawn, either in the vapor state or as described above by withdrawing a portion of the solution containing the catalyst components, unreacted feed, equilibrium components, and the desired product. The desired product is then separated from solution to permit recycling of the catalyst containing solution which also includes unreacted feed and equilibrium components.

As noted above, the most useful reactants employed in the present process are essentially alkanols and derivatives thereof such as ethers, esters and organic halides, having from 1 to 20 carbon atoms, including both straight chain and branched chain components. The second essential component is carbon monoxide. However, the carbon monoxide need not be a high purity stream such as has been required by prior art processes. Instead, the carbon monoxide may be a low-concentration mixture containing from 1 vol. percent to a high concentration stream containing 100 vol. percent of carbon monoxide. In the impure carbon monoxide streams, the remainder of the gas mixture generally is comprised of gases select d from the group consisting of nitrogen, hydrogen, carbon dioxide, water, noble gases, and paraffinic hydrocarbons having from 1 to 4 carbon atoms. Preferred ranges of carbon monoxide are from 10 vol. percent to 99.9 vol. percent, more preferably greater than 30 vol. percent, carbon monoxide.

EXAMPLE 1

A batch reactor is charged with the following ingredients: 0.554 gram of $IrCl_3 \cdot 4H_2O$, 28.8 grams of methyl iodide, 196.9 grams of acetic acid as a solvent, and 79 grams of methanol as feedstock.

The reactor is pressurized with carbon monoxide to a total pressure of 1000 p.s.i.g., corresponding to a carbon monoxide partial pressure of about 800 p.s.i.g., at the reaction temperature of 175° C. The reaction is carried out at a constant pressure to yield a solution containing the following distribution of products:

87.5 wt. percent acetic acid
4.6 wt. percent methyl iodide
8.9 wt. percent (catalyst components, etc.)

The selectivity to the formation of the desired acetic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 82 minutes. The present experiment as well as the other examples, is carried out at a slow rate in order to permit a study of the mechanism of the reaction. However, when the rates are increased to those of a commercial unit, high selectivity and conversions are also obtained.

When this experiment is conducted with the equivalent molar quantity of cobalt chloride instead of iridium chloride, the selectivity and yield of the desired acetic acid product are decreased significantly. It has been found that cobalt catalysts differ radically from iridium containing catalyst systems in that the cobalt catalysts also cause hydrogenation reactions such as hydrogenation of the desired carboxylic acid product to aldehydes and alcohols of the same number of carbon atoms. Consequently, the use of cobalt catalysts results in the substantial production of various undesirable byproducts including ethanol, acetaldehyde, and the next higher carbon number carboxylic acid, e.g., propionic acid. Another distinction of the iridium containing catalyst systems over the cobalt catalyst is the elimination of undesirable gaseous byproducts, including carbon dioxide and methane which are obtained as a result of the water-gas shift reaction catlyzed by cobalt. Furthermore, significant quantities of the undesirable byproduct, dimethyl ether, are also formed in the presence of the cobalt catalyst system, as shown in Examples 6 and 7 below. This ether compound attains a very high partial pressure at the reaction conditions employed, and necessitates the use of a high total pressure reaction system to maintain the necessary partial pressure of carbon monoxide for reaction to form carboxylic acids, e.g., 2000 p.s.i.g. total pressure for 750 p.s.i.g.

carbon monoxide partial pressure, at a reaction temperature of 175° C.

Still another distinction of the present iridium containing catalyst systems compared to the cobalt catalysts is the fact that lower carbon monoxide partial pressures can be used without encountering metal plating. Thus, metal plating or decobalting occurs in Example 7 at 2000 p.s.i.g. carbon monoxide partial pressure, with increasing plating out at lower pressures. In contrast, the present iridium containing catalyst systems, as in Example 17, do not plate out metal even at 130 p.s.i.g. carbon monoxide partial pressure.

EXAMPLE 2

A batch reactor is charged with the following ingredients: 1.17 grams of an iridium complex (coordination compound) having the formula $Ir(CO)Cl[P(C_6H_5)_3]_2$, 28.8 grams of methyl iodide, (ratio of halogen to iridium atoms about 140:1), 196.9 grams of acetic acid as a solvent, and 79 grams of methanol as feedstock.

The reactor is pressurized with carbon monoxide to a total pressure of 1000 p.s.i.g., corresponding to a carbon monoxide partial pressure of about 800 p.s.i.g., at the reaction temperature of 175° C. The reaction is carried out at a constant pressure to yield a solution containing the following distribution of products:

93.80 wt. percent acetic acid
2.30 wt. percent methyl iodide
3.90 wt. percent (catalyst components, etc.)

Selectivity to the formation of the desired carboxylic acid product is greater than 95% at substantially 100% conversion of methanol. No substantial amounts of by-products such as aldehydes, dimethyl ether, higher boiling carboxylic acids, methane, or carbon dioxide are formed. The time required for 50% of the methanol to be converted to acetic acid is 200 minutes.

This example demonstrates the effect of the use of an iridium complex in the catalyst system instead of the simple iridium salt employed in Example 1.

EXAMPLE 3

In this example, use of an additional source of the iridium component of the catalyst system is illustrated.

A batch reactor is charged with the following ingredients: 0.414 grams of $Ir_4(CO)_{12}$, 28.8 grams of methyl iodide, 196 grams acetic acid as solvent, and 79 grams of methanol as feedstock. The reactor is pressurized with carbon monoxide to a total pressure of 1000 p.s.i.g. (partial pressure of carbon monoxide about 800 p.s.i.g.) at the reaction temperature of 175° C. The reaction is carried out at constant pressure to yield a solution containing the following distribution of products:

86.3 wt. percent acetic acid
3.4 wt. percent methyl iodide
10.3 wt. percent (catalyst components, etc.)

Selectivity to formation of the carboxylic acid product is greater than 95% at substantially 100% methanol conversion. No undesirable by-products such as aldehydes, dimethyl ether, higher boiling carboxylic acids, methane, carbon dioxide, etc. are detected by gas chromatography. The time required for 50% of the methanol to be converted to acetic acid is 112 minutes.

This example uses a halogen to iridium ratio (atoms of iodine per atom of iridium) of about 140:1. However, it is found that the use of lower ratios such as 10:1, as well as still lower ratios, such as 3:1 give useful results.

EXAMPLE 4

This example demonstrates the use of an inert solvent. A batch reactor is charged with the following components: 0.135 gram of $IrCl_3 \cdot 4H_2O$, 1.0 gram of 57% aqueous hydrogen iodide, 48 grams of benzene as solvent, and 20 grams of methanol as feedstock. The reactor is pressurized with carbon monoxide to a total pressure of 700 p.s.i.g. (400 p.s.i.g. partial pressure of carbon monoxide) at the reaction temperature of 195° C. The reaction is carried out at constant pressure to yield a solution containing approximately 100 wt. percent acetic acid and a trace of methyl iodide on a solvent-free basis. Selectivity to formation of the carboxylic acid product is greater than 99% at substantially 100% methanol conversion. The methyl acetate which is produced in the reaction is in equilibrium with the various reactants and products, and exerts no deleterious effect on the catalytic reaction system. In a continuous operation, the methyl acetate attains an equilibrium concentration, so that the methyl acetate removed during product separation steps is recycled to the reactor system. Consequently, no yield or selectivity losses occur due to the presence and formation of undesirable byproducts such as aldehydes, higher alcohols, dimethyl ether or higher boiling carboxylic acids. No methane or carbon dioxide is detected by gas chromatography. The time required for 50% of the methanol to be converted to acetic acid is about 180 minutes. The ratio of alcohol to ester in the feedstock in this example is about 10,000:1 (which corresponds to a substantially pure methanol feedstock) even in the presence of benzene as an inert solvent. Also the conversion level of the methanol feedstock is greater than 90%. As predicted by the criteria set forth above the major product of this reaction is acetic acid.

EXAMPLE 5

This example demonstrates that the reaction may be carried out in the presence of a carbon monoxide stream containing significant quantities of hydrogen without the formation of undesirable products such as acetaldehyde, ethanol nor catalyst decomposition. A batch reactor is charged with 32 grams of 5 wt. percent iridium metal on carbon, 57.5 grams of $CH_3I$, 154 grams of benzene as solvent, and 79 grams of methanol feedstock. The reactor is pressurized with a gas mixture of 62 vol. percent carbon monoxide and 38 vol. percent hydrogen at a total pressure of 2,000 p.s.i.g. (1100 p.s.i.g. partial pressure of carbon monoxide) at a temperature of 175° C. The selectivity to formation of the acetic acid product is greater than 95% at substantially 100% conversion of methanol. No substantial amounts of reduced materials or other by-products such as aldehydes, dimethyl ether, ethanol, higher boiling carboxylic acids, methane, carbon dioxide, etc. are detected by gas chromatography, thus distinguishing from cobalt catalysts which yield such byproducts as the result of hydrogenation catalyzed by the cobalt. The time required for 50% of the methanol to be converted to acetic acid is 122 minutes.

A similar result is obtained with another synthetic gas mixture, e.g., a 66 vol. percent hydrogen, 33 vol. percent carbon monoxide, such as is obtained from a commercial unit. The various impurities, e.g., nitrogen, noble gases, hydrogen, carbon dioxide and paraffinic hydrocarbons of 1 to 4 carbon atoms, which are present in such feed gas mixtures, do not adversely affect the present reaction.

EXAMPLE 6

This example demonstrates that cobalt carbonyl is a far less effective catalyst system than the present system containing, for example, iridium and iodine. A batch reactor is charged with the following ingredients: 2.58 grams of cobalt carbonyl, 28.8 grams of $CH_3I$, 165 grams of benzene as solvent, and 79 grams of methanol feedstock. The reactor is initially pressurized with carbon monoxide to a total pressure of 1000 p.s.i.g. (750 p.s.i.g. carbon monoxide partial pressure) at the reaction temperature of 175° C. The reaction is carried out at a constant pressure. More than 50 mole percent of the methanol feedstock is converted to dimethyl ether. Water and a trace amount of methyl acetate are also produced. No acetic acid is obtained.

EXAMPLE 7

This example demonstrates that cobalt salts are relatively poor catalysts for the production of acetic acid from methanol even when higher pressures of carbon monoxide and higher temperatures are employed. A batch reactor is charged with the following ingredients: 1.57 grams of $Co(C_2H_3O_2)_2 \cdot 4H_2O$, 3.81 grams of iodine, and 237 grams of methanol feedstock. The reactor is initially pressurized with carbon monoxide to a total pressure of 2500 p.s.i.g. (2000 p.s.i.g. carbon monoxide partial pressure) at the reaction temperature of 195° C. Rapid decomposition of the cobalt catalyst to cobalt metal (plating out) occurs. Analysis of the reaction mixture shows that more than 60 mole percent of the methanol feedstock is converted to dimethyl ether. A considerable amount of water is also produced, and less than 5 mole percent of the methanol feedstock is converted to methyl acetate and acetic acid.

EXAMPLE 8

This example demonstrates the ability to use the product as a solvent for the reaction without any deleterious effects on the rate of the reaction or product distribution.

A batch reactor is charged with the following ingredients: 0.13 gram of $IrO_2$, 0.5 gram of methyl iodide, 52 grams of acetic acid as solvent, and 20 grams of methanol as feedstock. The reactor is pressurized with carbon monoxide to a total pressure of 1000 p.s.i.g. (about 800 p.s.i.g. partial pressure of carbon monoxide) at the reaction temperature of 195° C. The reaction is carried out at constant pressure to yield a solution containing, as determined by gas chromatography, approximately 100 wt. percent acetic acid with a trace of methyl iodide being present. No methanol or methyl acetate is detected. The selectivity to formation of carboxylic acid product is greater than 99% at substantially 100% methanol conversion. No undesirable byproducts such as aldehydes, dimethyl ether, higher boiling carboxylic acids, methane, carbon dioxide, etc. are detected by gas chromatography. The time required for 50% of the methanol to be converted to acetic acid is 65 minutes.

EXAMPLE 9

This example demonstrates the effect of partial pressure of carbon monoxide on the reactions.

This example is similar to Example 1 except that the iridium level is reduced by one-half and the reactor is pressurized with carbon monoxide to a total pressure of 400 p.s.i.g. (about 200 p.s.i.g. carbon monoxide partial pressure) at the reaction temperature of 195° C. The time for 50% of the methanol to be converted to acetic acid is 150 minutes. The composition of the resulting reaction solution, as determined by gas chromatography, is shown below.

91.2 wt. percent acetic acid
3.7 wt. percent methyl iodide
5.1 wt. percent (catalyst components, etc.)

No methanol or methyl acetate is detected. Also, no undesirable byproducts such as aldehydes, dimethyl ether, higher boiling carboxylic acids, methane, carbon dioxide, etc. are detected.

EXAMPLE 10

A batch reactor is charged with the following ingredients: 0.554 gram of $IrCl_3 \cdot 4H_2O$, 10.2 grams of 57 wt. percent aqueous hydrogen iodide, 196.9 grams of acetic acid as solvent, and 79 grams of methanol feedstock. The reactor is pressurized with carbon monoxide to a total pressure of 2000 p.s.i.g. (about 1800 p.s.i.g. carbon monoxide partial pressure) at the reaction temperature of 195° C. The reaction is carried out at constant pressure to yield a solution containing the following distribution of components, as determined by gas chromatography.

91.0 wt. percent acetic acid
1.2 wt. percent methyl iodide
7.8 wt. percent (catalyst components, etc.)

No methanol or methyl acetate is detected. Selectivity to formation of the carboxylic acid product is greater than 95% at substantially 100% methanol conversion. No undesirable byproducts such as aldehydes, dimethyl ether, higher boiling carboxylic acids, methane, carbon dioxide, etc. are detected by gas chromatography. The time required for 50% of the methanol to be converted to acetic acid is 69 minutes.

This example demonstrates that the use of carbon monoxide partial pressures as high as 1800 p.s.i.g. gives similar results to use of the lower partial pressures of carbon monoxide employed in Examples 8 and 9. The results of Examples 8, 9 and 10 show that the use of high pressures (e.g., 5000–15,000 p.s.i.g.) such as are required with cobalt catalysts are not necessary when using the iridium containing catalyst systems of the present invention.

In the above Examples 8, 9 and 10, the acetic acid solvent and methanol readily esterify to an extent such as to produce a molar ratio of methanol to ester of about 0.001:1 (which corresponds to a substantially pure methyl acetate feedstock). In accordance with the criteria set forth above, the ratio of alcohol to ester is a controlling factor in product distribution. Consequently, the major product of these reactions is acetic acid.

EXAMPLE 11

This example demonstrates that an increase in temperature increases the reaction rate.

This example is similar to Example 1 except that the reaction temperature is 200° C. The composition of the resulting reaction solution is substantially the same as that of Example 1. The time required for 50% of the methanol to be converted to acetic acid is 45 minutes as compared with 82 minutes in Example 1 at a temperature 25° C. lower.

EXAMPLE 12

This example further demonstrates the use of iridium metal as a source of the iridium component of the present catalyst system.

A batch reactor is charged with the following ingredients: 6.4 grams of commercial 5 wt. percent iridium metal on carbon, 10.2 grams of 57 wt. percent aqueous hydrogen iodide, 197 grams of acetic acid as solvent, and 79 grams of methanol feedstock. The reactor is pressurized with carbon monoxide to a total pressure of 1000 p.s.i.g. (carbon monoxide partial pressure about 750 p.s.i.g.) at the reaction temperature of 175° C. The reaction is carried out at constant pressure to yield a solution containing the following distribution of products (exclusive of solvent):

>99.9 wt. percent acetic acid
0.7 wt. percent methyl iodide

Selectivity to formation of the carboxylic acid product is greater than 99% at substantially 100% conversion of methanol. No substantial amounts of byproducts such as aldehydes, dimethyl ether, higher boiling carboxylic acid, methane and carbon dioxide are detected by gas chromatography. The time required for 50% of the methanol to be converted to acetic acid is 150 minutes.

EXAMPLE 13

This example demonstrates the effect of the rate of reaction as a function of the concentration of the iodine as an iodine containing component. This example is similar to Example 1 except that only 15 grams of the methyl iodide is added. The selectivity to formation of carboxylic acid product is greater than 95% at substantially 100% conversion of methanol. No substantial amounts of byproducts such as aldehydes, dimethyl ether, etc. are detected by gas chromatography. The time required for 50% of the methanol to be converted to acetic acid is 140 minutes as compared with 82 minutes in Example 1 when approximately twice as much iodide component is used.

EXAMPLE 14

A batch reactor is charged with the following ingredients: 0.860 grams of $IrI_3$, 28.8 grams of methyl iodide, 196.9 grams of acetic acid as a solvent, and 79 grams of methanol as feedstock.

The reactor is pressurized with carbon monoxide to a total pressure of 1000 p.s.i.g. (corresponding to a carbon monoxide partial pressure of about 800 p.s.i.g.) at the reaction temperature of 175° C. The reaction is carried out at a constant pressure to yield a solution containing the following distribution of products:

86.4 wt. percent acetic acid
4.2 wt. percent methyl iodide
9.4 wt. percent (catalyst components, etc.)

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 58 minutes.

This example demonstrates the effect of having the iodine partly charged with iridium as iridium iodide.

EXAMPLE 15

A batch reactor is charged with the following ingredients: 0.554 grams of $IrCl_3 \cdot 4H_2O$, 18 grams of water, 33.6 grams of potassium iodide (ratio percent I/Ir about 143:1) 178.5 grams of acetic acid as a solvent, and 79 grams of methaol as feedstock.

The reactor is pressurized with carbon monoxide to a total pressure of 1000 p.s.i.g., corresponding to a carbon monoxide partial pressure of about 800 p.s.i.g., at the reaction temperature of 175° C. Little, if any, reaction is observed. Analysis of a liquid sample withdrawn from the reactor via gas chromatography indicates essentially no methyl iodide present in the reaction mixture. However, upon subsequent addition of a mineral acid $H_3PO_4$, the reaction initiates and forms the following distribution of products:

91.2 wt. percent acetic acid
4.3 wt. percent methyl iodide
4.5 wt. percent (catalyst components, etc.)

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid after the mineral acid addition is 100 minutes.

In separate experiments, similar results are obtained employing HCl, HBr and $H_2PO_3$ as the mineral acid.

EXAMPLE 16

A batch reactor is charged with the following ingredients: 1.32 grams of $Ir(CO)Cl[As(C_6H_5)_3]_2$, 28.8 grams of methyl iodide, 196.9 grams of acetic acid as a solvent, and 79 grams of methanol as feedstock.

The reactor is pressurized with carbon monoxide to a total pressure of 1000 p.s.i.g., corresponding to a carbon monoxide partial pressure of about 800 p.s.i.g. at the reaction temperature of 175° C. The reaction is carried out at a constant pressure to yield a solution containing the following distribution of productions:

85.4 wt. percent acetic acid
4.7 wt. percent methyl iodide
9.9 wt. percent (catalyst components, etc.)

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 216 minutes.

This example demonstrates the use of a triphenylarsine as a source of the iridium component of the present catalyst system.

EXAMPLE 17

A batch reactor is charged with the following ingredients: 0.554 grams of $IrCl_3 \cdot 4H_2O$, 57.6 grams of methyl iodide, 196.9 grams of acetic acid as a solvent, and 79 grams of methanol as feedstock.

The reactor is pressurized with carbon monoxide to a total pressure of 400 p.s.i.g., corresponding to a carbon monoxide partial pressure of about 130 p.s.i.g., at the reaction temperature of 200° C. The reaction is carried out at a constant pressure to yield a solution containing the following distribution of products:

91.9 wt. percent acetic acid
3.9 wt. percent methyl iodide
4.2 wt. percent (catalyst components, etc.)

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 40 minutes.

This example demonstrates that high reactivity is obtained even at low carbon monoxide partial pressure, and extending down to about 1 p.s.i.g. partial pressure, as compared to Example 1, and Example 20, below, the latter example showing the reaction to proceed to substantially zero partial pressure of carbon monoxide.

EXAMPLE 18

A batch reactor is charged with the following ingredients: 0.554 gram of $IrCl_3 \cdot 4H_2O$, 5.0 grams of iodide as $I_2$, 178.5 grams of acetic acid as a solvent, and 79 grams of methanol as feedstock.

The reactor is pressurized with carbon monoxide to a total pressure of 1000 p.s.i.g., corresponding to a carbon monoxide partial pressure of about 800 p.s.i.g., at the reaction temperature of 175° C. The reaction is carried out at a constant pressure to yield a solution containing the following distribution of products:

92.6 wt. percent acetic acid
3.8 wt. percent methyl iodide
3.6 wt. percent (catalyst components, etc.)

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 110 minutes.

This example demonstrates the use of $I_2$ as a source of the halogen component of the present catalyst system.

EXAMPLE 19

A batch reactor is charged with the following ingredients: 0.554 gram of $IrCl_3 \cdot 4H_2O$, 28.8 grams of methyl iodide, and 215 grams of a methanol feedstock containing 10 wt. percent dimethyl ether.

The reactor is pressurized with carbon monoxide to a total pressure of 1000 p.s.i.g., corresponding to a carbon monoxide partial pressure of about 700 p.s.i.g., at the reaction temperature of 175° C. The reaction is carried out at a constant pressure to yield a solution containing the following distribution of products:

86.1 wt. percent acetic acid
4.2 wt. percent methyl iodide
9.7 wt. percent (catalyst components, etc.)

Selectivity to the formation of the desired carboxylic acid product is greater than 95% at substantially 100% conversion of methanol. No substantial amounts of byproducts such as aldehydes, dimethyl ether, higher boiling carboxylic acids, methane, or carbon dioxide are formed. The time required for 50% of the methanol to be converted to acetic acid is 96 minutes.

This example demonstrates the effect of an impure alcohol feedstock having ether in the alcohol. Thus the commercial alcohol ether product from a methanol plant is shown as having no deleterious effect on the reaction.

EXAMPLE 20

A batch reactor is charged with the following ingredients: 0.554 gram of $IrCl_3 \cdot 4H_2O$, 28.0 grams of methyl iodide, 25.6 grams of acetic acid, 36.8 grams of water, 49.1 grams of methanol, and 151.2 grams of methyl acetate, which corresponds to the equilibrium concentrations of the ester and water components under the reaction conditions employed. The reactor is pressurized with carbon monoxide to a total pressure of 1000 p.s.i.g., corresponding to a carbon monoxide partial pressure of about 750 p.s.i.g., at the reaction temperature of 175° C. The reaction is carried out at a constant volume until substantially all of the carbon monoxide is reacted (final reactor pressure about 250 p.s.i.g., corresponding to substantially zero partial pressure of carbon monoxide because of the complete reaction of carbon monoxide).

The reaction product distribution which is obtained has substantially the same methyl acetate and water concentrations as initially charged; however, approximately 58 wt. percent of the methanol charged to the reactor is converted to acetic acid.

No substantial amounts of byproducts such as aldehydes, dimethyl ether, higher boiling carboxylic acids, methane or carbon dioxide are formed. The time required for substantially all of the carbon monoxide to be reacted with methanol and thus converted to acetic acid is 60 minutes which corresponds to a space-time yield (STY) of about 3.0 moles of product/liter of catalyst solution/hour. The rate of carbon monoxide conversion is changed by a factor of less than 2 over this total conversion range. It is also noted that the rate parameters of this, and the other examples is obtained when using a rate sufficiently low to permit a study of the reaction mechanism. However, when the rates are increased to those of a commercial unit, the same high selectivity and conversions are maintained.

This example demonstrates the process concept of operating a continuous reactor to produce acetic acid from methanol while maintaining equilibrium recycle streams of the ester (methyl acetate) and water, and resulting in a net conversion of the methanol feedstock to the desired acetic acid product while maintaining the said equilibrium conditions.

EXAMPLE 21

A continuous reaction system is operated in which methanol and the equilibrium concentrations of methyl acetate and water are obtained from a commercial plant recycle system. The catalyst system including the methyl iodide, and the components charged to the reactor in Example 20, is continuously passed through a tubular reaction zone maintained at 195° C. yielding a similar result of that of Example 20. The use of a distillation separation train to recover unreacted methanol, and the equilibrium components methyl acetate and water, as well as the acetic acid product, permits the recycling of the catalyst. Another product of the continuous reaction is the equilibrium mixture of methyl acetate and water, which may be recycled.

EXAMPLE 22

A batch reactor is charged with the following ingredients: 0.135 gram of $IrCl_3 \cdot 4H_2O$, 1.7 grams of $CaI_2 \cdot 3H_2O$ 50 grams of acetic acid, and 22 grams of methanol as feedstock.

The reactor is pressurized with carbon monoxide to a total pressure of 700 p.s.i.g., corresponding to a carbon monoxide partial pressure of about 550 p.s.i.g., at the reaction temperature of 195° C. The reaction is carried out at a constant pressure to yield a solution containing the following distribution of products: 89.1 wt. percent acetic acid, 3.4 wt. percent methyl iodide, 7.5 wt. percent (catalyst components, etc.). This example demonstrates the use of an inorganic halogen compound as a source of the halogen component of the present catalyst system.

EXAMPLE 23

A batch reactor is charged with the following ingredients: 1.17 grams of $[(C_6H_5)_3P]_2IrCOCl$, 51 grams of aqueous 57% hydrogen iodide, 179 grams of benzene as a solvent, and 100 grams of 1,4-butanediol as feedstock. The reactor is pressurized with carbon monoxide to a total pressure of 500 p.s.i.g., corresponding to a carbon monoxide partial pressure of about 425 p.s.i.g., at the reaction temperature of 195° C. The reaction is carried out at a constant pressure to yield a solution containing the following distribution of products: 30.7 wt. percent adipic acid, 69.3 wt. percent (catalyst, etc.). No substantial amounts of byproducts such as aldehydes, ether, higher boiling carboxylic acids, paraffins or carbon dioxide are formed.

EXAMPLE 24

A batch reactor is charged with the following ingredients: 0.554 gram of $IrSl_3 \cdot 4H_2O$, 51 grams of aqueous 57% hydrogen iodide, 150 grams of benzene as a solvent, and 82 grams of hexanol as feedstock. The reactor is pressurized with carbon monoxide to a total pressure of 500 p.s.i.g., corresponding to a carbon monoxide partial pressure of about 425 p.s.i.g., at the reaction temperature of 195° C. The reaction is carried out at a constant pressure to yield a solution containing the following distribution of products:

88.1 wt. percent heptanoic acid
4.2 wt. percent hexyl iodide
7.7 wt. percent (catalyst components, etc.)

No substantial amounts of byproducts such as aldehydes, ethers, higher boiling carboxylic acids, paraffins or carbon dioxide are formed.

This example demonstrates the ability of the catalyst system to carbonylate long chain alcohols.

EXAMPLE 25

A batch reactor is charged with the following ingredients: 0.554 gram of $IrCl_3 \cdot 4H_2O$, 21.6 grams of water, 10.7 grams of methyl iodide, 89 grams of methyl acetate, and 128 grams of methanol as feedstock, which is equivalent to an alcohol to ester mole ratio of about 3.4.

The reactor is pressurized with carbon monoxide to a total pressure of 500 p.s.i.g., corresponding to a carbon monoxide partial pressure of about 250 p.s.i.g., at the reaction temperature of 195° C. The reaction is carried out at a constant pressure to yield a solution having the following composition:

55.6 wt. percent methyl acetate
15.1 wt. percent acetic acid
1.2 wt. percent methyl iodide
16.6 wt. percent (catalyst components, water, etc.)
11.5 wt. percent methanol Selectivity to the formation of the desired ester and acid product is about 97% at about 74% conversion of methanol. No substantial amounts of byproducts such as aldehydes, dimethyl ether, higher boiling carboxylic acids, methane, and/or carbon dioxide are formed. The time required for the reaction is 129 minutes. The product distribution of the mixture of acid and ester products is in accordance with the criteria set forth herein for an alcohol/ester feed ratio in the range of 2 to 10. The reaction in this example results in a net production of 84 grams of methyl acetate and 49 grams of acetic acid.

EXAMPLE 26

A batch reactor is charged with the following ingredients: 0.554 gram of $IrCl_3 \cdot 4H_2O$, 10.7 grams of methyl iodide, 72 grams of acetic acid as a solvent, and 167 grams of methanol as feedstock, which after esterification of the acid and methanol results in the same alcohol/ester feed ratio of 3.4, as in Example 25, within the reaction medium.

The reactor is pressurized with carbon monoxide to a total pressure of 500 p.s.i.g., corresponding to a carbon monoxide partial pressure of about 200 p.s.i.g., at the reaction temperature of 195° C. The reaction is carried out at a constant pressure to yield a solution containing substantially the same product distribution as in Example 25 under similar reaction conditions.

In accordance with the criteria set forth herein, the product distribution is controlled by the alcohol/ester feed ratio after equilibration through esterification even when the initially charged feed contains only organic acid and alcohol instead of the preformed ester of the two compounds. Consequently the product distribution is a mixture of acid and ester products in accordance with the alcohol/ester ratio range of 2 to 10.

EXAMPLE 27

A batch reactor is charged with the following ingredients: 0.554 gram of $IrCl_3 \cdot 4H_2O$, 10.2 grams of aqueous 57 wt. percent hydrogen iodide, 30 grams of acetic acid, and 210 grams of methanol, which, after esterification of the alcohol and acid, results in an alcohol to ester ratio of about 12:1.

The reactor is pressurized with carbon monoxide to a total pressure of 500 p.s.i.g., corresponding to a carbon monoxide partial pressure of about 200 p.s.i.g., at the reaction temperature of 195° C. The reaction is carried out at a constant pressure to yield a solution having the following composition:

50.1 wt. percent methyl acetate
6.3 wt. percent acetic acid
1.1 wt. percent methyl iodide
21.3 wt. percent (catalyst components, etc.)
21.2 wt. percent methanol Selectivity to the formation of the desired ester product is about 90% at about 66% conversion of methanol. No substantial amounts of byproducts such as aldehydes, dimethyl ether, higher boiling carboxylic acids, methane, and/or carbon dioxide are formed. The time required for the reaction is 110 minutes. The product distribution of a high proportion of ester is in accordance with the criteria set forth herein for an alcohol/ester feed ratio greater than 10, and a methanol conversion of less than 90%.

In this example, after equilibration of the initially charged components, the solution contains about 37 grams of methyl acetate, 196 grams of methanol and only about 0.5 gram of acetic acid. After the reaction, the solution contains about 160 grams of methyl acetate and 20 grams of acetic acid which corresponds to a net production of 123 grams of methyl acetate and 19 grams of acetic acid or about 90% of the product being the ester.

EXAMPLE 28

This example further demonstrates the scope of compounds of iridium, which may be charged as a source of the iridium component of the present catalyst system.

A batch reactor is charged with the following ingredients: 0.414 gram of an iridium (O) compound with the formula $Ir_4(CO)_{12}$, 25.5 grams of aqueous 57 wt. percent hydrogen iodide, 196.6 grams of acetic acid, and 79 grams of methanol.

The reactor is pressurized with carbon monoxide to a total pressure of 1000 p.s.i.g., corresponding to a carbon monoxide partial pressure of about 800 p.s.i.g., at the reaction temperature of 175° C. The reaction is carried out at constant pressure. A good yield of acetic acid is obtained.

EXAMPLE 29

A batch reactor is charged with the following ingredients: 0.396 gram of iridium compound having the formula $IrCl_3 \cdot 4H_2O$, 51 grams of a promoter consisting of aqueous 57% hydrogen iodide, 215 grams of tertiary butyl alcohol as feedstock.

The reactor is pressurized with carbon monoxide to a total pressure of 500 p.s.i.g., corresponding to a carbon monoxide partial pressure of about 400 p.s.i.g., at the reaction temperature of 195° C. The reaction is carried out at a constant pressure. A good yield of pivalic acid is obtained.

EXAMPLE 30

Example 10 is repeated except that hydrogen bromide is substituted for hydrogen iodide. A significant yield of acetic acid is obtained.

What is claimed is:
1. A process for the carbonylation of reactants selected from the group consisting of compounds having the formulas ROH where R is a saturated hydrocarbyl radical of 1 to 20 carbon atoms, R'—O—R' wherein R' is a saturated hydrocarbyl radical of 1 to 19 carbon atoms and wherein the total number of carbon atoms in the compound does not exceed 20, wherein R' is a saturated hydrocarbyl radical of 1 to 19 carbon atoms and wherein the total number of carbon atoms in the compound does not exceed 20, and R—X wherein R is a saturated hydrocarbyl radical of 1 to 20 carbon atoms and X is a halogen selected from the group consisting of chlorine, bromine and iodine, said process comprising contacting
(1) at least one of said reactants,
(2) carbon monoxide, and
(3) a catalyst system consisting essentially of
 (a) an iridium compound, and
 (b) a halogen component
wherein during said contacting, said iridium compound and said halogen component are present in an amount sufficient to catalyze the carbonylation of said reactants, said contacting being carried out at a temperature in the range of 50 to 300° C. and at a carbon monoxide partial pressure in the range of 1 to 15,000 p.s.i.g., and when said reactants consist of compounds having the formulas said contacting is also in the presence of water, and said halogen component of (3b) is bromine, iodine, a bromide compound or an iodide compound.

2. The process of claim 1 wherein at least a portion of said halogen component of (3b) is iodine or an iodide compound.

3. The process of claim 2 wherein said contacting is carried out in an aqueous acidic reaction medium.

4. The process of claim 2 wherein said halogen component of (3b) is present in an amount of above two atoms of halogen per atom of iridium.

5. The process of claim 1 wherein said iridium compound of (3a) and said halogen component of (3b) are contained in a liquid reaction medium.

6. The process of claim 5 wherein said halogen component of (3b) is present in an amount such as to produce a halogen to iridium atomic ratio of from above 2:1 to 50,000:1.

7. The process of claim 6 wherein said halogen component is an iodide compound.

8. The process of claim 7 wherein said liquid reaction medium contains water and when said reactants consist of compounds having the formula said water is present during said contacting in a 50 to 300% excess of the amount of water required to be in equimolar relation to said compounds having the formula 9. The process of claim 8 wherein said reactants are selected from the group consisting of methanol, methyl acetate, dimethyl ether and methyl chloride.

10. The process of claim 1 wherein said reactants are a mixture of methanol and methyl acetate.

11. The process of claim 1 wherein said iridium compound of (3a) is dispersed upon an inert solid support.

12. The process of claim 11 wherein said carbonylation is carried out in the vapor phase.

13. A process for the carbonylation of reactants selected from the group consisting of methanol, dimethyl ether, methyl acetate, and methyl chloride, said process comprising contacting
 (1) at least one of said reactants,
 (2) carbon monoxide, and
 (3) a catalyst system consisting essentially of
  (a) an iridium compound, and
  (b) a halogen component
wherein during said contacting, said iridium compound and said halogen component are present in an amount sufficient to catalyze the carbonylation of said reactants, said contacting being carried out at a temperature in the range of 50 to 300° C. and at a carbon monoxide partial pressure in the range of 1 to 15,000 p.s.i.g., at least a portion of said halogen component being provided by hydrogen iodide, hydrogen bromide, methyl iodide or methyl bromide and said contacting also being carried out in an aqueous acidic reaction medium.

14. The process of claim 13 wherein said reactant is methanol and at least a portion of said halogen component of (3b) being provided by hydrogen iodide.

15. The process of claim 13 wherein said reactants are a mixture of methanol and methyl acetate and at least a portion of said halogen component of (3b) being provided by methyl iodide.

16. A process for the carbonylation of reactants selected from the group consisting of compounds having the formulas ROH where R is a saturated hydrocarbyl radical of 1 to 20 atoms, R'—O—R' wherein R' is a saturated hydrocarbyl radical of 1 to 19 carbon atoms and wherein the total number of carbon atoms in the compound does not exceed 20, wherein R' is a saturated hydrocarbyl radical of 1 to 19 carbon atoms and wherein the total number of carbon atoms in the compound does not exceed 20, and R—X wherein R is a saturated hydrocarbyl radical of 1 to 20 carbon atoms and X is a halogen selected from the group consisting of chlorine, bromide and iodine, said process comprising contacting
 (1) at least one of said reactants,
 (2) carbon monoxide, and
 (3) a catalyst system consisting essentially of
  (a) an iridium compound, and
  (b) a halogen component
wherein during said contacting, said iridium compound and said halogen component are present in an amount sufficient to catalyze the carbonylation of said reactants and said halogen comoponent is present in an amount of above two atoms of halogen per atom of iridium, said contacting being carried out at a temperature in the range of 50 to 300° C. and at a carbon monoxide partial pressure in the range of 1 to 15,000 p.s.i.g., and when said reactants consist of compounds having the formulas R'—O—R', and R—X, said contacting is also in the presence of water, said iridium compound of (3a) is provided by a material selected from the group consisting of iridium salts, iridium oxides and iridium carbonyls consisting only of iridium and carbonyl moieties and said halogen component of (3b) is provided by bromine, iodine, a bromide compound or an iodide compound.

17. The process of claim 16 wherein said reactants comprise a mixture of methanol and methyl acetate, said halogen component of (3b) is provided by an iodine compound, said iodide compound being present in an amount such as to produce an iodide to iridium atomic ratio within the range of above 2:1 to 50,000:1, said iridium compound of (3a) and said iodide compound being contained in a liquid reaction medium and said liquid reaction medium contains water.

18. The process of claim 16 wherein said iridium compound of (3a) is dispersed upon an inert solid support.

19. The process of claim 18 wherein said carbonylation is carried out in the vapor phase.

20. The process of claim 16 wherein said reactant is methanol, said halogen component of (3b) is hydrogen iodide and said contacting is carried out in an aqueous acidic reaction medium.

References Cited
UNITED STATES PATENTS

| | | | |
|---|---|---|---|
| 2,739,169 | 3/1956 | Hagemeyer, Jr. | 260—540 |
| 2,710,878 | 6/1955 | Glasebrook | 260—532 |
| 3,020,314 | 3/1962 | Alderson | 260—533 |

VIVIAN GARNER, Primary Examiner

U.S. Cl. X.R.

260—410.9 R, 413, 468 CB, 485 G, 491, 493, 496, 514 C, 532, 540, 541